United States Patent
Dower et al.

(10) Patent No.: US 11,768,788 B2
(45) Date of Patent: Sep. 26, 2023

(54) BUS ENDPOINT ISOLATION

(71) Applicant: Hewlett-Packard Development Company, L.P., Spring, TX (US)

(72) Inventors: Glen Douglas Dower, Fort Collins, CO (US); Stephen G. Uhlmann, Taipei (TW); Peter A. Seiler, Fort Collins, CO (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/435,448

(22) PCT Filed: Jul. 23, 2019

(86) PCT No.: PCT/US2019/042922
§ 371 (c)(1),
(2) Date: Sep. 1, 2021

(87) PCT Pub. No.: WO2021/015736
PCT Pub. Date: Jan. 28, 2021

(65) Prior Publication Data
US 2022/0164304 A1   May 26, 2022

(51) Int. Cl.
*G06F 13/40* (2006.01)
*G06F 13/16* (2006.01)

(52) U.S. Cl.
CPC ...... *G06F 13/4022* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 4,141,068 A | | 2/1979 | Mager et al. |
| 6,532,547 B1 * | | 3/2003 | Wilcox ............... G06F 11/2089 710/72 |
| 6,704,820 B1 | | 3/2004 | Walker et al. |
| 6,728,793 B1 | | 4/2004 | McRobert et al. |

(Continued)

FOREIGN PATENT DOCUMENTS

| | | |
|---|---|---|
| CN | 106528464 A | 3/2017 |
| CN | 107317737 A | 11/2017 |
| CN | 107870880 A | 4/2018 |

*Primary Examiner* — Idriss N Alrobaye
*Assistant Examiner* — Dayton Lewis-Taylor
(74) *Attorney, Agent, or Firm* — Knobbe, Martens, Olson & Bear, LLP

(57) ABSTRACT

An example of a controller for bus endpoint isolation can include an interface to couple to a bus that has respective communication channels and respective switches corresponding to endpoints of the bus, a processing resource, and a memory resource storing non-transitory instructions executable by the processing resource to select a first endpoint of the endpoints to receive a message from the interface via a first switch on a first communication channel associated with the first endpoint, cause, via a switch control mechanism, a second switch associated with a second endpoint of the bus to open to isolate the second switch; and responsive to causing the second switch to open, send the message via the first communication channel and the first switch to the first endpoint.

13 Claims, 4 Drawing Sheets

(56) References Cited

U.S. PATENT DOCUMENTS

| | | |
|---|---|---|
| 7,043,570 B2 | 5/2006 | Fry et al. |
| 7,827,333 B1 | 11/2010 | Wyatt et al. |
| 8,332,566 B2 | 12/2012 | Slaight |
| 9,355,053 B2 | 5/2016 | Bradley |
| 9,940,275 B2 | 4/2018 | Venkatasubba et al. |
| 10,382,390 B1 * | 8/2019 | Venkataramanan .... H04L 67/56 |
| 2004/0015634 A1 * | 1/2004 | Alexander .......... G06F 13/4243 710/305 |
| 2007/0162671 A1 * | 7/2007 | Seo ..................... G06F 13/4282 710/110 |
| 2012/0017101 A1 * | 1/2012 | So ......................... G06F 1/325 713/300 |
| 2020/0341929 A1 * | 10/2020 | Lambert ............. G06F 13/4221 |

\* cited by examiner

BUS ENDPOINT ISOLATION

BACKGROUND

A computer system can include various electronic components, such as a processor, a memory, an input/output (I/O) device, and so forth. The computer system can include a bus over which the various electronic components are able to communicate.

DETAILED DESCRIPTION

Figure 1:
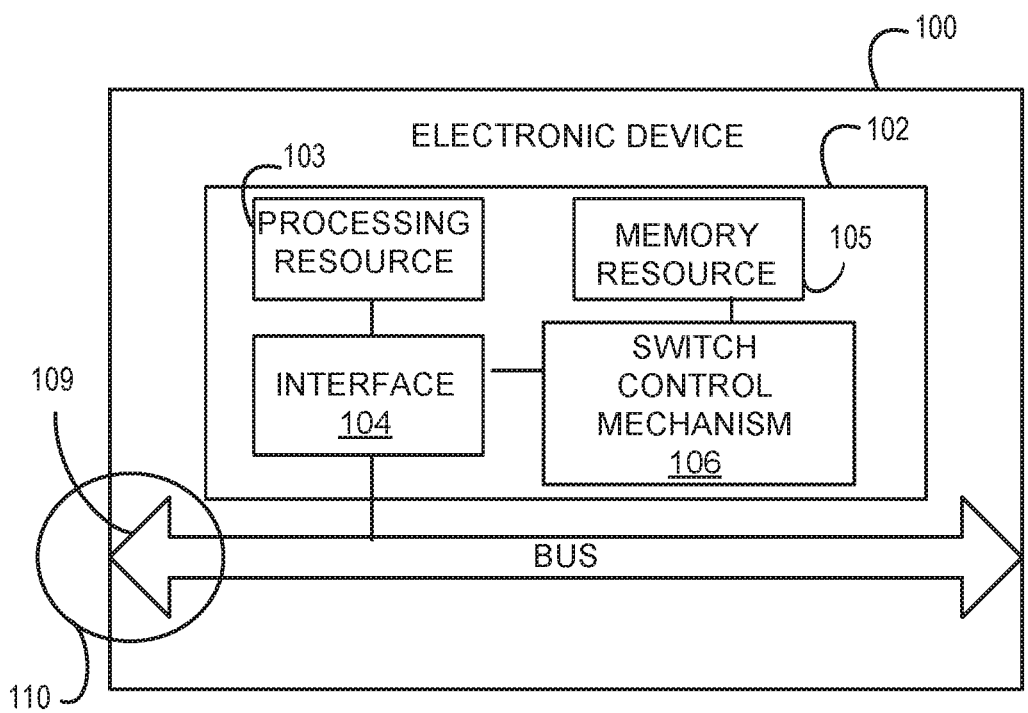
FIG. 1 illustrates an example of an electronic device for bus endpoint isolation consistent with the disclosure.

A physical connection between an endpoint device (i.e., a peripheral device) and an electronic device can facilitate communication between the endpoint device and the electronic device. For instance, an endpoint device can utilize a physical connection provided via a bus to an internal resource (e.g., a chipset, a computer processing unit, integrated circuit, etc.) of the electronic device to communicate with the electronic device. The physical connection can permit communication via a communication channel. As used herein, a communication channel refers to a mechanism provided by a bus to facilitate communication between an electronic device and an endpoint device. A communication channel can include a clock signal and a data signal to facilitate communication between an electronic device and an endpoint device, among other possibilities.

A communication channel can be a sideband communication channel. As used herein, a sideband communication channel refers to a communication channel that facilities communication between an electronic device and an endpoint device in the absence of communication with a main central processing unit (CPU) of an electronic device. Examples of communication channel specifications/protocol supporting sideband communication channels include System Management Bus (SMB), Advanced Platform Management Link (APML), Inter-integrated Circuit (I²C) and/or I³C, among others.

An electronic device can have a fixed total number of communication channels. Some approaches attempt to allocate the fixed number of communication channels using static allocation (i.e., maintaining one-to-one relationships between an endpoint and a communications channel and/or bus interface) and/or allocate communication channels responsive to an endpoint device physically coupling to an electronic device. However, the above approaches are subject to underutilization of communications channels, and notably, can result in address conflicts.

As used herein, an address conflict refers to when multiple endpoint devices coupled to a bus have the same endpoint address (i.e., slave address/device address) on the bus. Address conflicts can occur for a variety of reasons. For instance, a first endpoint device and a second endpoint device can be made by different manufacturers who unknowingly utilize the same endpoint address. Address conflicts can also occur if two identical endpoint devices, with the same endpoint address, are coupled to the same bus. Address conflicts can render endpoint devices inoperable and/or otherwise undesirably impact performance of an endpoint device and/or an electronic device the endpoint device is coupled to.

Accordingly, the disclosure provides bus endpoint isolation. As used herein, bus endpoint isolation refers a switch being open so an endpoint device on a bus associated with the open switch is unable to communicate with the bus. As detailed herein, bus endpoint isolation can be used to resolve known address conflicts and/or avoid unknown address conflicts (such as when an address of an endpoint device is unknown and/or subject to change). Additionally, bus endpoint isolation can occur dynamically (during runtime) to facilitate greater (full) utilization of communications channels and/or communication channel segments, as compared to other approaches such as those described above.

FIG. 1 illustrates an example of an electronic device 100 for bus endpoint isolation consistent with the disclosure. The electronic device 100 can include a controller 102, an interface 104, a switch control mechanism 106, and a bus 109 including a bus interface as represented at 110.

Figure 2:
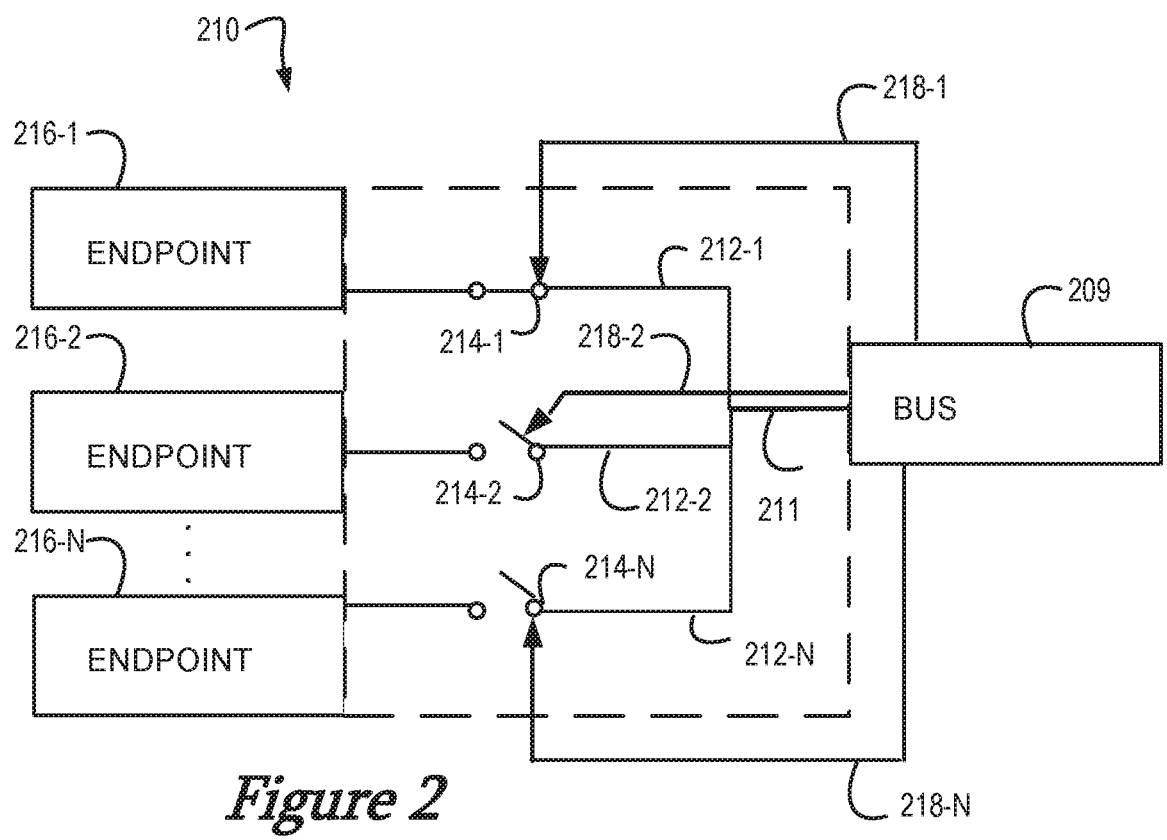
FIG. 2 illustrates an example of a bus interface of the electronic device of FIG. 1.
Figure 3:
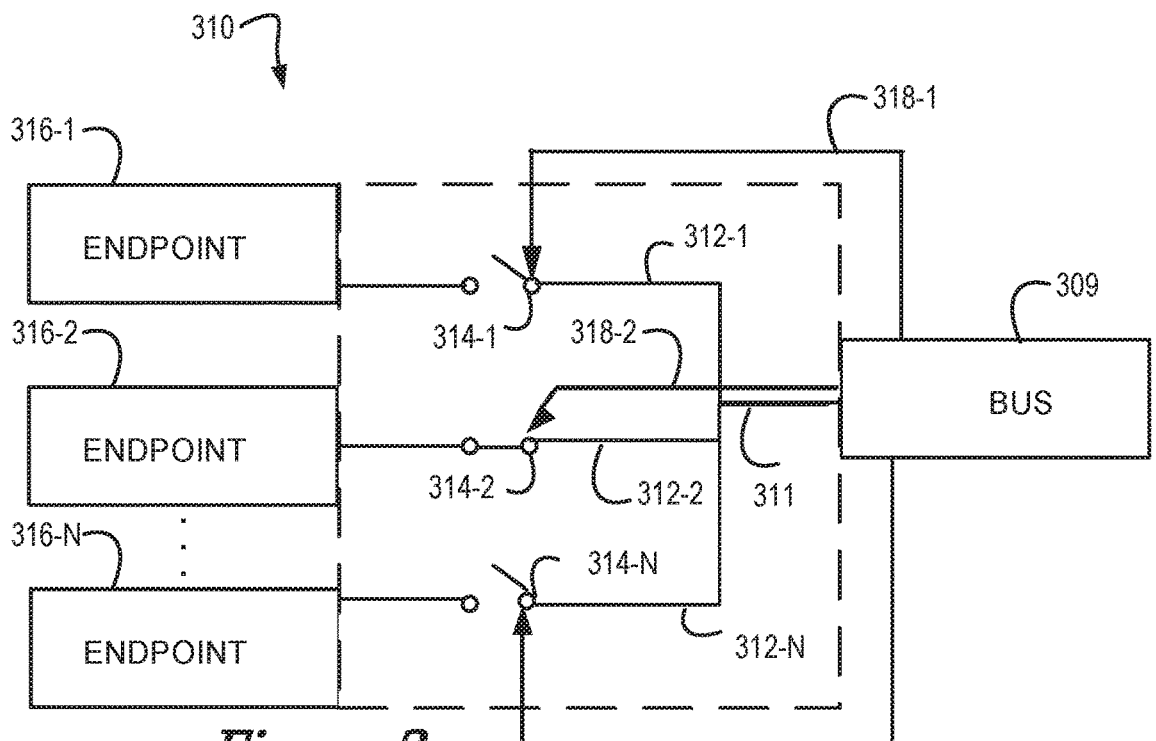
FIG. 3 illustrates another example of a bus interface of the electronic device of FIG. 1.
Figure 5:
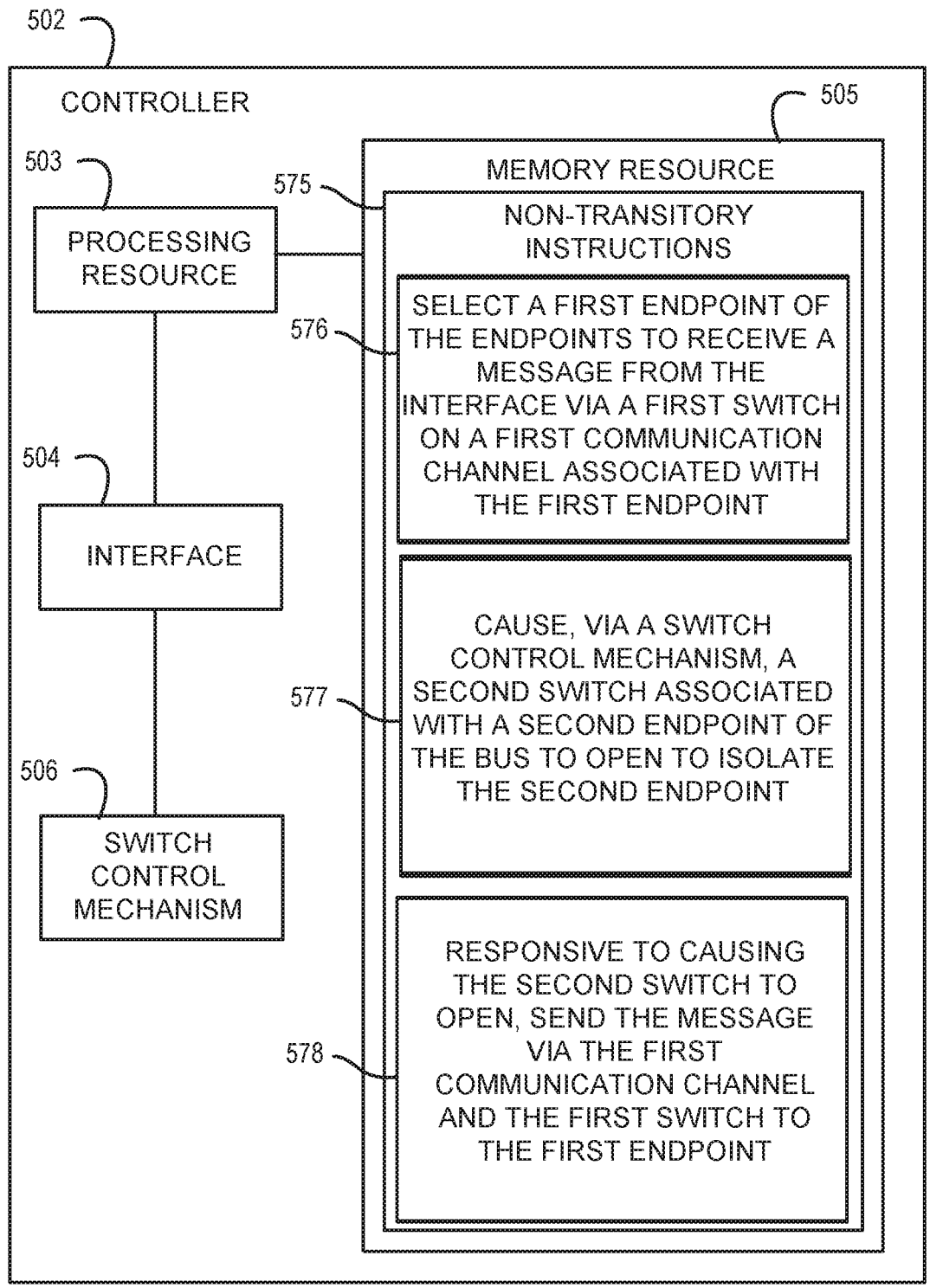
FIG. 5 illustrates an example of a controller for bus endpoint isolation consistent with the disclosure.

The controller 102 can be analogous or similar to and/or 502 as described with in FIGS. 2, 3, and 5, respectively. For instance, the controller 102 can include a processing resource 103 and a memory resource 105. The controller 102 can be removably coupled or otherwise coupled to the electronic device 100. In any case, the controller 102 can facilitate and/or perform various aspects related to bus endpoint isolation. For instance, the controller 102 can control various aspects related to the bus 109, as described herein.

The processing resource 103 refers to a hardware processing unit such as a central processing unit (CPU), integrated circuit, a semiconductor based microprocessor, a graphics processing unit (GPU), application specific instruction set processor, coprocessor, network processor, field programmable gate array (FPGA) or similar hardware circuitry that can suitable for retrieval and execution of non-transitory machine-readable instructions such as those stored on and/or downloadable to the memory resource 105.

The memory resource 105 refers to any type memory such as volatile and/or non-volatile memory. The memory resource 105 can be any electronic, magnetic, optical, or other physical storage device that stores executable instructions such as non-transitory machine-readable instructions described herein. Thus, the memory resource can be, for example, Random Access Memory (RAM), an Electrically-Erasable Programmable Read-Only Memory (EEPROM), a storage drive, an optical disc, and the like. The non-transitory machine executable instructions can be installed on the memory resource 105. However, the non-transitory machine-readable instructions can be a portable, external, or remote storage medium, for example, that allows the controller 102 to download the instructions from a portable/external/remote storage medium.

The interface 104 can be bus such as SMB, APML, I²C, I³C and/or other type of bus to permit connection between the controller 102 and the bus 109.

The switch control mechanism 106 can include a SMB switch IC, APML switch IC, I²C switch IC, I³C switch IC, a general-purpose input/output (GPIO) pin, and/or other mechanism capable of controlling a position of a switch on the bus 109. As an example, the switch mechanism 106 can change a switch position (e.g., to be closed) and a post-pended instruction can cause the switch to revert (e.g., to be open). In such examples, a communication session can occur via the closed switch between an endpoint device (not illustrated) and the electronic device 100 and yet normal (runtime) operation of the electronic device 100 can be ensured by reverting the switch to the open position following completion of the communication session.

The switch control mechanism 106 can send an instruction to write a register value such as an inverse register value for a GPIO pin to cause a change in a position of a switch, as detailed herein. A register value for the GPIO pin of the controller 102 can correspond to respective switch positions, such as a register value of "0" corresponding to a switch being open and a register value of "1" corresponding to a switch being closed. For instance, in various examples the controller 102 can include a total number of GPIO pins that is equal to a total number of switches (for ease of illustration not illustrated in FIG. 1) of the bus 109 such that each GPIO pin can store a value corresponding to a given position of each switch of the bus 109. However, different relative numbers of switches and/or GPIO pins can be employed.

Similarly, the switch control mechanism 106 can pre-pend or post-pend a SMB instruction to a SMB switch to cause a change in a position of the switch, as detailed herein. As used herein, being pre-pended refers to a switch control instruction (sent via a switch control line or otherwise) being executed in advance of a message being sent to an endpoint device (e.g., a read request) as part of a communication session with the endpoint device. For instance, a pre-pended instruction can cause a switch to change to a given position to selectively isolate endpoints of a bus and thereby avoid any address conflicts. Conversely, as used herein being post-pended refers to a switch control instruction being executed after a message being sent to an endpoint device (e.g., a read request) as part of a communication session with the endpoint device. For instance, post-pended instructions can cause a switch to revert to an initial position (a position before the change caused by the pre-pended switch control instructions).

The SMB instruction can be provided in accordance with a SMBus Specification such as SMBus specification version 2.0 or other SMBus Specifications. For instance, the SMB instruction can be provided in the following send byte protocol at (1), below.

$$\begin{array}{|c|c|c|c|c|c|c|} \hline 1 & 7 & 1 & 1 & 8 & 1 & 1 \\ \hline S & \text{Slave Address} & \text{Wr} & & \text{Data Byte} & & P \\ \hline \end{array} \quad (1)$$

In such examples, the SMB instruction can include instructions provided in the data byte above, for a plurality of communication channels and/or communication channel segments, as will be described in great detail with respect to FIGS. 2 and 3 herein. The instructions provided in one or more of the data byte bits can correspond to respective switch positions, such as a bit value of "0" corresponding to a switch being open and a "1" corresponding to a switch being closed, among other possibilities.

In any case, whether provided as writable GPIO values or values in an SMB message the switch control mechanism 106 can provide values (e.g., 0 or 1 corresponding to a switch being open or closed, respectively) for some or all switches in a communication channel and/or some or all switches in communication segments of the communication channel. For instance, when a communication channel includes three communication segments (e.g., as illustrated in FIGS. 2 and 3) the switch control mechanism can provide values for some or all three communication segments to cause a corresponding change in a switch position on some or all three communication segments.

The bus 109 can be a SMB bus, APML bus, I²C bus, or I³C bus, among other types of buses. As used herein, a SMB refers to a simple two-wire bus or three-wire bus. In any case, the bus 109 includes the bus interface 110. The bus interface 110 refers to a physical connection that provides a plurality of communication channels such as a plurality of sideband communication channels suitable for communication with endpoint devices when coupled via the bus interface 110 to the bus 109. FIGS. 2 and 3 detail examples of bus interfaces of the electronic device 100.

For instance, FIG. 2 illustrates an example of a bus interface 210 of the electronic device of FIG. 1. As illustrated in FIG. 2, the bus interface 210 of bus 209 can provide a communication channel 211. The communication channel 211 can branch into a plurality of communication channel segments 212-1, 212-2, . . . , 212-N. The communication channel segments 212-1, 212-2, . . . , 212-N can share a communication mechanism such as clock and data signal, and/or other type of communication mechanism with the communication channel 211.

Each communication channel segment of the communication channel segments 212-1, 212-2, . . . , 212-N can include a switch to enable or disable communication with a respective endpoint of each communication channel segment. For instance, a first communication segment 212-1 can include a first switch 214-1 associated with a first endpoint 216-1. Similarly, a second communication segment 212-2 can include a second switch 214-2 associated with a second endpoint 216-2 and a third communication segment 212-N can include a third switch 214-N associated with a third endpoint 216-N. Examples of suitable switches include a discrete MOSFET-based circuits or an integrated circuit (IC), among other types of switches that can switch on or off different communication channels and/or communication channel segments connected thereto.

Each switch can have a corresponding switch control line. For instance, the first switch 214-1 can have a first switch control line 218-1, the second switch 214-2 can have a second switch control line 218-2, and the third switch 214-N can have a third switch control line 218-N. A switch control mechanism (e.g., switch control mechanism 106 as described with respect to FIG. 1) can determine a switch status and/or change a switch position via switch control lines such as switch control lines 218-1, 218-2, . . . , 218-N. The switch control lines can be internal to an IC, for instance in the case of SMB switch, there may be multiple switches that are controlled by switch control lines internal to the IC.

FIG. 3 illustrates another example of a bus interface 310 of the electronic device of FIG. 1. Bus interface 310 is analogous or similar to bus interface 110 and 210, as illustrated in FIGS. 1 and 2, respectively. For instance, bus interface 310 can provide a communication channel 311 that branches into a plurality of communication channel segments 312-1, 312-2, . . . , 312-N. As mentioned, a first communication segment 312-1 can include a first switch 314-1 associated with a first endpoint 316-1. Similarly, a second communication segment 312-1 can include a second switch 314-2 associated with a second endpoint 316-2, and a third communication segment 312-N can include a third switch 314-N associated with a third endpoint 316-N. As mentioned, the first switch 314-1 can have first switch control line 318-1. Similarly, the second switch 314-2 can have a second switch control line 318-2 and the third switch 314-N can have a third switch control line 318-N.

While FIGS. 2 and 3 illustrate an individual communication channel and a given number of communication segments, switches, switch control lines, and endpoints it is understood that a number of communication channels, communication channel segments, switches, switch control lines, and/or endpoints can be varied. For instance, in some examples a switch can be a multi-position switch coupled to a plurality of endpoints and/or a plurality of communication channels. In such examples a channel can include an individual multiple-position switch capable of selection of a particular channel.

As detailed herein, a controller can select an endpoint (e.g., endpoint 316-2) to receive a message. Selection of an endpoint can occur responsive to any condition or input such as responsive to an endpoint device coupling/decoupling to the endpoint, responsive to a system condition, responsive to a user input, and/or periodically, etc. Based on selection of the endpoint, a switch control mechanism (not illustrated in FIG. 3) can cause another switch (e.g., switch 314-1) associated with the another endpoint (e.g., endpoint 316-1) to change a status, for instance from being closed as illustrated in FIG. 2 to being open as illustrated in FIG. 3. Similarly, the switch control mechanism can, in some examples, cause a switch (e.g., switch 314-2) to change a status, for instance from being open as illustrated in FIG. 2, to being closed as illustrated in FIG. 3. The switch control mechanism can cause a change in a plurality of switches. In this way, the switch control mechanism can selectively isolate some or all endpoints that are not selected and thereby avoid any (known/unknown) address conflict with the selected endpoint. That is, having a given switch open (electrically open) can prohibit communication between the bus 309 and an endpoint (a non-selected endpoint) associated with the switch that is open.

Figure 4:
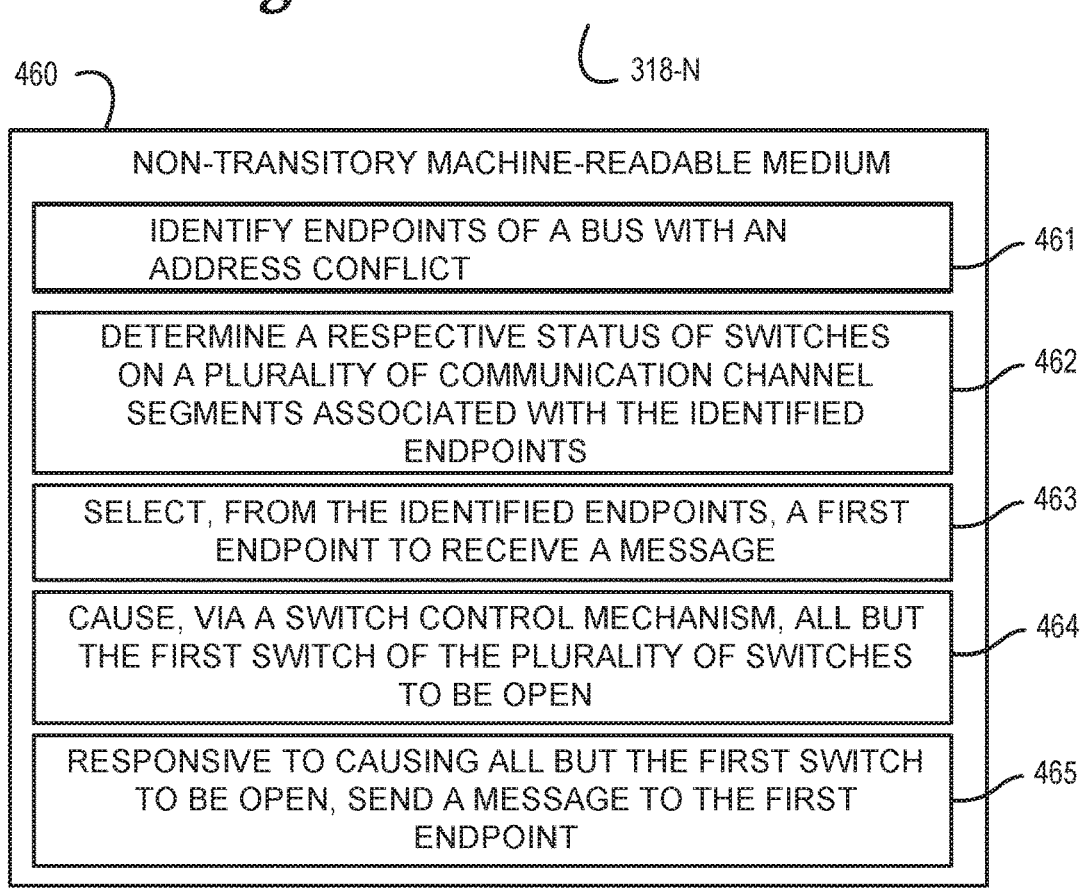
FIG. 4 illustrates an example of a non-transitory machine-readable medium for bus endpoint isolation consistent with the disclosure.

FIG. 4 illustrates an example of a non-transitory machine-readable medium 460 for bus endpoint isolation consistent with the disclosure. The medium 460 can be any electronic, magnetic, optical, and/or other physical storage device that stores non-transitory executable instructions such as those represented by 461, 462, 463, 464, and 465. Thus, non-transitory computer readable medium 460 can be, for example, Random Access Memory (RAM), an Electrically-Erasable Programmable Read-Only Memory (EEPROM), a storage drive, an optical disc, and the like. The non-transitory executable instructions such as those represented by 461, 462, 463, 464, and 465 can be executed by a processing resource such as those described herein.

In various examples, the medium 460 can include instructions 461 executable to identify endpoints of a bus with an address conflict, as described herein. Such address conflict identification can occur periodically, responsive to a system condition, responsive to an input to an electronic device including the endpoints, and/or responsive to an endpoint device coupling/decoupling with an endpoint, among other possibilities. Address conflicts can be identified by various types of communication with an endpoint and/or an endpoint device such a probe and/or message sent to an endpoint and/or endpoint device. Endpoints with address conflicts can be located on the same communication channel and/or different communication channels. In some examples, endpoints with address conflicts can be on different communication channel segments of the same communication channel.

Endpoints and/or endpoint devices without a conflict (having a unique address) can be identified through the same or similar types of communications as those utilized to identify endpoints with address conflicts. As used herein, a unique address refers to an address not shared with another known endpoint device on the same bus. Endpoints and/or endpoint devices with an unknown address refer to endpoints other than those having an address conflict or a unique address.

Endpoints and/or endpoint devices address statuses (conflicted, unique, or unknown) can be stored in a memory resource such as those described herein. The address statuses can for instance in a look-up table and/or other format to promote aspects of bus endpoint isolations as described herein.

The medium 460 can include instructions executable to determine a respective status of switches on communication channels and/or communication channel segments. For instance, the medium 460 can include instructions 462 to determine a respective status of switches on a plurality of communication channel segments associated with the identified endpoint (identified at 461), among other possibilities. A respective switch status can be determined via a switch control line (e.g., switch control line 218-1 as described with respect to FIG. 2). Switch statuses include being open or closed, though other statuses are possible. As used herein, when open the switch does not permit communication with an endpoint and/or an endpoint device, Conversely, when closed the switch permits communication with an endpoint and/or an endpoint device.

Identified switch statues (on/off) and/or endpoint devices address statuses (conflicted, unique, or unknown) can be stored in a memory resource such as those described herein. For instance, identified switch statuses and/or endpoint devices address statuses can be stored in a memory resource in a look-up table and/or other format to promote aspects of bus endpoint isolation, as described herein.

The medium 460 can include instructions executable to select an endpoint to receive a message. For instance, the medium 460 can include instructions 463 executable to select, from the identified endpoints, a first endpoint (associated with a first communication channel segment including a first switch) to receive a message, as described herein.

The medium 460 can include instructions executable to cause, via a switch control mechanism, a switch other than the selected switch (e.g., the first switch) to open. For instance, the medium 460 can include instructions 464 to cause, via a switch control mechanism, all but the first switch of the plurality of switches to be open to isolate the switches other than the first switch and thereby avoid any address conflict with the first endpoint. For example, all other switches (other than the first/selected endpoint) on a given communication channel and/or all other switch across a plurality of communication channels can be caused to be open. However, the disclosure is not so limited.

Rather, in some examples the instructions 460 can be executable to cause all other conflicted switches (having the same address as the first switch) to open, but leave other switches (having a unique and/or an unknown address) unchanged (open/closed). Causing the conflicted switches other than the selected switch (e.g., the first switch) to open avoids address conflicts with the selected switch, but leaves switches in other communication channels and/or communication channel segments unchanged to permit normal (runtime) operation of the unchanged communication channels and/or communication channel segments. That is, switches associated with conflicted and/or unknown endpoints can be caused to open, while other switches associated with endpoints having a unique address can be left unchanged, among other possibilities. Thus, in some examples the instructions 460 can be executable to isolate the second endpoint (by causing a second switch associated with the second endpoint to be open) responsive to the second endpoint having an address conflict with the first endpoint or the second endpoint having an unknown address.

The medium 460 can include instructions that are executable to send a message to a selected endpoint. In some examples, the medium 460 can include instructions 465 that responsive to causing a switch other than a selected switch to open, are executable to send a message to the selected switch. Similarly, in some examples the medium 460 can include instructions 465 that responsive to causing all but the first switch to be open, are executable to send a message to the first endpoint, among other possibilities.

The medium 460 can include revert instructions executable to cause a switch to revert to an initial position. In some examples, the revert instructions can be a post-pended inverse SMB instruction and/or an instruction to write an inverse register value for an GPIO pin. As used herein, an inverse SMB instruction refers to a post-pended SMB instruction having an inverse value (e.g., a value of 0) relative to a value included in a pre-pended SMB instruction (e.g., a value of 1). As used herein, an inverse register value refers to an inverse value (e.g., a value of 0) relative to a register value (e.g., a value of 1) sent to switch in advance of a communication session between an endpoint associated with the switch an electronic device.

FIG. 5 illustrates an example of a controller 502 for bus endpoint isolation consistent with the disclosure. As illustrated in FIG. 5, the controller 502 can include a processing resource 503, an interface 504, a memory resource 505, and a switch control mechanism 506.

In various examples, the controller 502 can include non-transitory machine-executable instructions 575 stored on the memory resource 505 and executable by the processing resource to perform various operations related to bus endpoint isolation. In some examples, the instructions 575 can be executable to provide bus endpoint isolation during runtime operation of the electronic device and/or in the absence of communication with a central-processing unit (CPU) of the electronic device, in contrast to other approaches such as those employing dedicated (static) addresses on communication channels and/or communication channel segments.

The instructions 575 can include instructions to select an endpoint to receive a message, as described herein. For instance, instructions to select, from a plurality of endpoints, a first endpoint or a second endpoint to receive a message. For example, the instructions 575 can include instructions 576 to select a first endpoint of the endpoints to receive a message from an interface via a first switch on a first communication channel associated with the first endpoint.

In various examples the instructions can be executable to cause, via a switch control mechanism, a switch to open or close, as described herein. For example, the instructions 575 can include instructions 577 to cause, via a switch control mechanism, a second switch associated with a second endpoint of the bus to open to isolate the second endpoint (e.g., from a first endpoint), as illustrated at 577.

The instructions 575 can include instructions to send a message such as a read or write message to a selected endpoint, as described herein. For instance, the instructions 575 can be executable to send a SMB formatted read message, as described herein, to a selected endpoint. As mentioned, the message can be sent via a communication channel and/or communication channel segment of the selected endpoint. For example, the instructions 575 can include instructions 578 that responsive to causing a second switch to open, send a message via a first communication channel and a first switch to a first endpoint (the selected endpoint), as illustrated at 578.

In some examples, the instructions 575 can include instructions to determine whether a switch associated with a selected endpoint is open or closed. The instructions 575 can further include instructions to close, via a switch control mechanism, the switch associated with the selected endpoint responsive to a determination that the switch is open. Such closing of the switch permits communication between an electronic device and the selected endpoint. Conversely, the instructions 575 can further include instructions to maintain the switch associated with the selected endpoint in a closed position responsive to a determination that the switch is closed.

Figure 6:
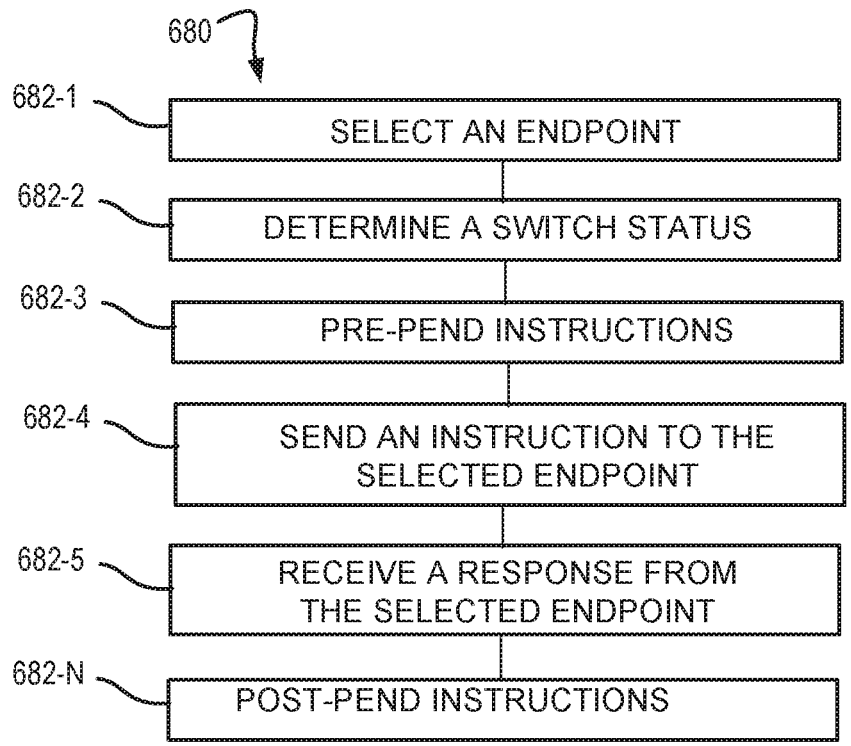
FIG. 6 illustrates an example of a method diagram for bus endpoint isolation consistent with the disclosure.

FIG. 6 illustrates an example of a method diagram 680 for bus endpoint isolation consistent with the disclosure. At 682-1 the method diagram 680 can select an endpoint, as described herein. For instance, a first endpoint can be selected from a plurality of endpoints on respective communication channel segments, among other possibilities. At 682-2 the method diagram 680 can determine a switch status such as being open or closed, as described herein.

At 682-3 the method diagram 680 can pre-pend instructions such as SMB instructions to a message. As mentioned, the pre-pended instructions can be sent from an electronic device to cause a switch (e.g., a second switch) associated with a non-selected endpoint (e.g., a second endpoint) to open. At 682-4 the method diagram 680 can send an instruction to the selected endpoint (selected at 682-1). For instance, a SMB read instruction can be sent to the selected endpoint to initiate a response from the selected endpoint and/or initiate a communication session. At 682-5 the method diagram 680 can receive a response from the selected endpoint. In some examples the instructions received can include data or other information regarding a make, model, status, and/or other information of an endpoint device coupled to the selected endpoint. At 682-N the method diagram 680 can post-pend instructions such as SMB instructions to a message to cause the switch (e.g., the second switch) associated with the non-selected endpoint (e.g., a second endpoint) to close to ensure normal (runtime) operation of an electronic device, among other possible types of post-pended instructions.

Figure 7:
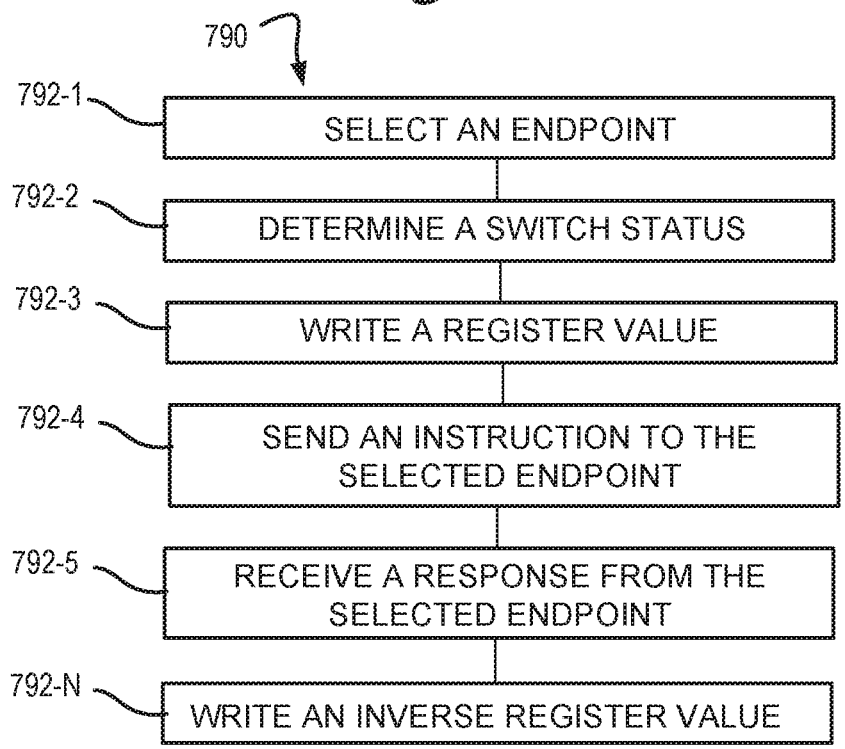
FIG. 7 illustrates another example of a method diagram for bus endpoint isolation consistent with the disclosure.

FIG. 7 illustrates another example of a method diagram 790 for bus endpoint isolation consistent with the disclosure. At 792-1 the method diagram 790 can select an endpoint, as described herein. For instance, a first endpoint can be selected from a plurality of endpoints on respective communication channel segments, among other possibilities. At 792-2 the method diagram 790 can determine a switch status such as being open or closed, as described herein.

At 792-3 the method diagram 790 can write a register value for a GPIO pin. As mentioned, the register value can cause a switch (e.g., a second switch) associated with a non-selected endpoint (e.g., a second endpoint) to open, among other possibilities. At 792-4 the method diagram 790 can send an instruction to the selected endpoint. For instance, a SMB read instruction can be sent to the endpoint to initiate a response from the selected endpoint. At 792-5 the method diagram 790 can receive a response from the endpoint. In some examples, the instructions received can include data or other information regarding a make, model, status, or other information of an endpoint device coupled to the selected endpoint. At 792-N the method diagram 790 can write an inverse register value for the GPIO pin to cause the switch (e.g., the second switch) associated with the non-selected endpoint (e.g., a second endpoint) to close to ensure normal (runtime) operation of an electronic device.

In the foregoing detailed description of the disclosure, reference is made to the accompanying drawings that form a part hereof, and in which is shown by way of illustration how examples of the disclosure can be practiced. The figures herein follow a numbering convention in which the first digit corresponds to the drawing figure number and the remaining digits identify an element or component in the drawing. For example, reference numeral 110 can refer to element 110 in FIG. 1 and an analogous element can be identified by reference numeral 210 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

What is claimed is:

1. A controller comprising:
   an interface to couple to a bus that has respective communication channels and respective switches corresponding to endpoints of the bus;
   a processing resource; and
   a memory resource storing non-transitory instructions executable by the processing resource to:
      select a first endpoint of the endpoints to receive a message from the interface via a first switch on a first communication channel associated with the first endpoint;
      cause, via a switch control mechanism, a second switch associated with a second endpoint of the bus to open to isolate the second endpoint;
      responsive to causing the second switch to open, send the message via the first communication channel and the first switch to the first endpoint; and
      send an inverse system management bus (SMB) instruction post-pended to the message to cause the second switch to close,
      wherein the message includes a request to read data from the first endpoint or a request to write data to the first endpoint.

2. The controller of claim 1, further comprising instructions to determine whether the first switch is open or closed.

3. The controller of claim 2, further comprising instructions to close, via the switch control mechanism, the first switch responsive to a determination the first switch is open.

4. The controller of claim 1, wherein the switch control mechanism includes a system management bus (SMB), and wherein the instructions to cause the second switch to open include a SMB instruction pre-pended to the message, the SMB instruction sent from the SMB to the second switch.

5. The controller of claim 1, wherein the switch control mechanism includes a general-purpose input/output (GPIO) pin, and wherein the instructions to cause the second switch to open include instructions to write a register value for the GPIO pin of the controller to change to a value corresponding to the second switch being open.

6. The controller of claim 1, further comprising instructions to isolate the second endpoint responsive to the second endpoint having an address conflict with the first endpoint.

7. The controller of claim 1, further comprising instructions to isolate the second endpoint from the endpoints responsive to the second endpoint having an unknown address.

8. An electronic device including:
   a bus having communication channels corresponding to a plurality of endpoints on the bus, each communication channel segment of the communication channels having a respective switch;
   a switch control mechanism; and
   a controller including:
      an interface to couple to a bus having a first communication channel including:
         a first endpoint on a first communication channel segment of a first communication channel having a first switch; and
         a second endpoint on a second communication channel segment having a second switch;
      a processing resource; and
      a memory resource storing non-transitory instructions executable by processing resource to:
         identify an address conflict between the first endpoint and the second endpoint;
         select the first endpoint to receive a message;
         cause, via the switch control mechanism, the second switch to open;
         send the message to the first endpoint via the first communication channel segment and the first switch; and
         write an inverse register value for a general-purpose input/output (GPIO) pin to cause the second switch to close,
         wherein the message includes a request to read data from the first endpoint or a request to write data to the first endpoint.

9. The electronic device of claim 8, wherein the bus is to communicate in accordance with a System Management Bus (SMB), Advanced Platform Management Link (APML), Inter-integrated Circuit (I$^2$C) or I$^3$C protocol.

10. The electronic device of claim 8, wherein the instructions to cause the second switch to open are executable:
    during runtime operation of the electronic device; and
    in an absence of communication with a central-processing unit (CPU) of the electronic device.

11. The electronic device of claim 8, wherein the first switch is a discrete MOSFET-based circuit or an integrated circuit (IC).

12. The electronic device of claim 8, wherein the first endpoint and the second endpoint are on a sideband communication channel of the bus.

13. A non-transitory machine-readable medium storing instructions executable to:
    identify endpoints of a bus that have an address conflict;
    determine a respective status of switches on a plurality of communication channel segments associated with the identified endpoints;
    select, from the identified endpoints, a first endpoint to receive a message, wherein the first endpoint is associated with a first switch of a plurality of switches, and wherein the first switch is on a first communication channel segment;

cause, via a switch control mechanism, all but the first switch of the plurality of switches to be open to isolate all but the first endpoint of the identified endpoints;

responsive to causing all but the first switch to be open, send a message to the first endpoint; and revert the plurality of switches back to an initial position by sending an inverse SMB instruction post-pended to the message or writing an inverse register value for a GPIO pin.

\* \* \* \* \*